Nov. 27, 1962 F. E. SCHULTZ 3,065,598
REIGNITABLE SOLID ROCKET MOTOR
Filed Oct. 5, 1959

INVENTOR.
FREDERICK E. SCHULTZ
BY John F. Cullen
ATTORNEY

United States Patent Office 3,065,598
Patented Nov. 27, 1962

3,065,598
REIGNITABLE SOLID ROCKET MOTOR
Frederick E. Schultz, Ballston Lake, N.Y., assignor to
General Electric Company, a corporation of New York
Filed Oct. 5, 1959, Ser. No. 844,313
9 Claims. (Cl. 60—35.3)

The present invention relates to a reignitable solid rocket motor and, more particularly, to a controllable solid propellant rocket motor and method of operation thereof which permits it to be turned on and off at will during operation.

There are basically two types of rocket motors in existance today, the liquid propellant type and the solid propellant type. Both types have their advantages and disadvantages. One of the advantages of liquid propellant motors is that the liquid may be easily controlled and turned off to shut the motor down and the motor may be restarted by turning the liquid on again. The disadvantage of the liquid propellant type motor is the difficulty of liquid storage and the complexity and profusion of parts involved in the control mechanism. On the other hand, solid propellants are useful because of their ease of storage in which the propellants can be cast in a block form, mounted in the rocket engine, and set aside until time for use. The disadvantage is that, once ignited, the propellant burns until exhausted since there is no reliable means to extinguish the rocket and then reignite it.

It is felt that a solid propellant rocket propulsion system could become a considerably more practical and versatile means of propulsion if it were provided with a means of accurate, repeatable and reliable thrust termination and restarting means. In the advent of space flight, whether liquid or solid propellants are used, accuracy requires reignitable engines to permit entering an orbit which may not be quite correct, and then making adjustments by firing the engine in short bursts. Additionally, in any system in which it is necessary to fly at a fairly constant velocity, it is possible to remain at the fairly constant velocity by turning the motor on for a few seconds, turning it off and letting the vehicle coast down and then reigniting to accelerate, etc. It is thus possible to keep the velocity within a desired band. The ability to control the firing and to reignite the solid propellant motor would permit uses not heretofore practical. Normally, the solid propellant continuously burns and the vehicle constantly accelerates until it exhausts the fuel or eventually destroys itself.

A known means of controlling rocket solid propellants has been to provide the combustion chamber with blow-out plugs to reduce the pressure below that at which combustion may be maintained and to time the blow-out to occur at the desired instant. A recent development directs the gases so discharged to produce a negative thrust to effect clean separation in multiple stage rockets. However, this has the disadvantage in that very little control is possible since the plugs cannot be easily reinserted and the propellant reignited. Also, the fuel remaining after extinguishment is wasted. An additional means has been to provide many separate solid propellant charges and fire them in series in a timed interval. However, such a system lacks the flexibility of the system of the present invention.

The main object of the present invention is to provide a solid propellant rocket motor which may be extinguished and reignited at will during operation.

A further object is to provide such a motor which is inherently inoperable without the addition of an external fluid mass.

A still further object is to provide such a motor and a method of operating it which requires the operation of a simple valving mechanism to start and stop the solid propellants' combustion at will and provide accurate control of thrust generation.

Another object is to provide such a motor and a method of operating it which requires a simple valving mechanism to start and stop the propellant combustion at will and a small amount of control fluid to accurately control a large amount of combustion.

Briefly stated, the invention discloses a solid propellant motor having a combustion chamber which is designed to produce combustion products in a series of combustion sections. A conventional nozzle is attached to the downstream end of the combustion chamber to form a thrust chamber therewith. The thrust chamber has a main propellant charge therein which is designed to produce combustion products at a pressure below a threshold pressure so that combustion is not normally possible. In order to bring the pressure up to the required level to support combustion, an upstream booster mechanism is employed, which, generates a fluid which is discharged into the thrust chamber to increase the pressure therein above threshold pressure either by itself or in conjunction with gas generated by the main charge to attain combustion at the design rate. The booster charge may be accurately controlled by the introduction of an additional fluid mass to cause and sustain ignition by reaction with the booster charge. By maintaining a constant nozzle exit area, combustion is possible during the introduction of the additional mass and the additional mass and products of combustion of the booster chamber are directed to the thrust chamber to cause and/or sustain combustion therein. The series of combustion sections permits a cumulative effect and accurate control by the use of the additional control fluid mass and the system may be so designed that a very low flow rate can accurately control a very large solid propellant rocket and can start and stop the solid propellant at will.

While the specification concludes with claims particularly pointing out and distinctly claiming the subject matter which I regard as my invention, it is believed the invention will be better understood from the following description taken in connection with the accompanying drawing in which:

Figure 1:
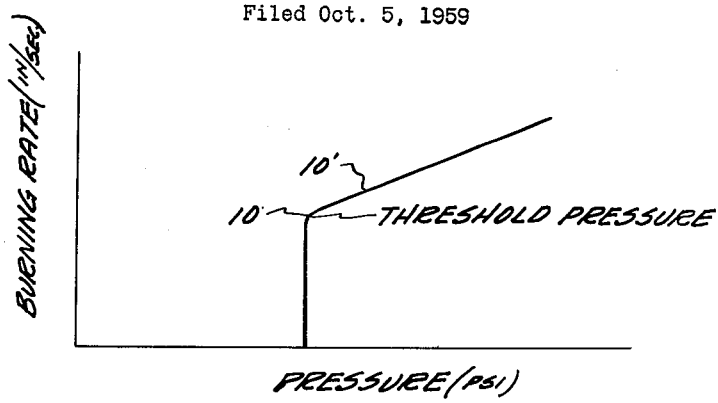
FIGURE 1 is a graph illustrating a propellant burning characteristic and showing the threshold pressure discussed in connection with the invention.

In the course of solid propellant formulation work, it has been found that certain grains in the solid propellant casting stop burning as the pressure drops below a certain minimum value which is called the "threshold pressure." Most burning processes proceed faster at higher pressure and the burning occuring in the solid propellant rocket is no exception. Thus, a pressure below the threshold pressure is too low to maintain combustion at a rate sufficient to sustain this threshold pressure. The curve illustrating this phenomenon is shown in FIGURE 1 wherein the burning rate in inches per second is plotted against the chamber pressure in pounds per square inch for a class of propellants. As can be seen by referring to FIGURE 1, this propellant will be extinguished when the threshold pressure 10 is reached. This pressure will depend on the particular propellant used. It is well-known that most rocket propellants of the ordinary variety will not burn at low pressure and have to have rather high pressure so that they can burn. This means that if a solid rocket is provided with a certain size throat in the nozzle, it will burn and operate properly at some point 10' on the curve known as the design pressure. However, if a larger throat is then provided, the pressure drops since fluid discharge is greater than fluid generation and the burning is extinguished. Thus, it is possible by dropping the pressure by either blow-out plugs or varying the nozzle, to extinguish this combustion in the combustion chamber. However, most rocket engines have a fixed area nozzle which is much simpler and avoids the complexity of the variable area type. Such a nozzle, of course, does not permit the use of the nozzle as a pressure varying means.

As previously stated, when the pressure is dropped below the value called the threshold pressure, burning stops. Usually this characteristic has been considered undesirable in solid propellants and little effort has been made to develop even an empirical understanding of the various factors which affect the threshold pressure. Neither has any extensive study been made of the characteristics of the threshold pressure, with the idea of making us of these characteristics to construct a controllable solid propellant rocket motor.

In designing a solid propellant motor, the burning surface and the exhaust area are so designed by known methods that the motor inherently develops more than the threshold pressure during combustion. This means that if the pressure in the combustion chamber is below the threshold pressure, the rate of gas generation is insufficient to maintain the chamber at that pressure without control fluid and the chamber pressure will rapidly decrease to ambient pressure at which point no burning takes place. If the chamber pressure is above the threshold pressure, sufficient gas is generated in conjunction with the control fluid, such that an equilibrium condition, such as 10' is reached. For convenience, these two conditions are referred to as no combustion below threshold pressure and combustion above threshold pressure. By deliberately designing the solid propellant charge to have, by itself, an insufficient gas generation rate to maintain threshold pressure, it is possible to introduce additional mass flow from external sources i.e. from other than the main propellant charge to increase the internal pressure and raise it above the threshold pressure to sustain burning. With a fixed nozzle, it is possible then to provide controlled shutdown and reignition in solid propellant motors.

In the discussion of the invention, it will be seen that the external admitted control fluid mass initially acts as the ignition source to fire and continuously burn by reaction with the booster charge to create products of combustion which, in turn, are used to create the desirable threshold pressure characteristics in the downstream combustion chamber.

The present invention is an improvement on co-pending application Serial Number 843,021, filed September 28, 1959, and a different modification or concept of the invention in co-pending application Serial Number 842,734, filed September 28, 1959, both of which are assigned to the assignee of the instant invention. In the first or basic application, there is disclosed and claimed the basic concept above described. The present invention is directed to an improvement thereto in which the external introduced fluid mass can be considerably smaller requiring smaller and lighter hardware and further simplification of the basic invention of the above application.

Figure 2:
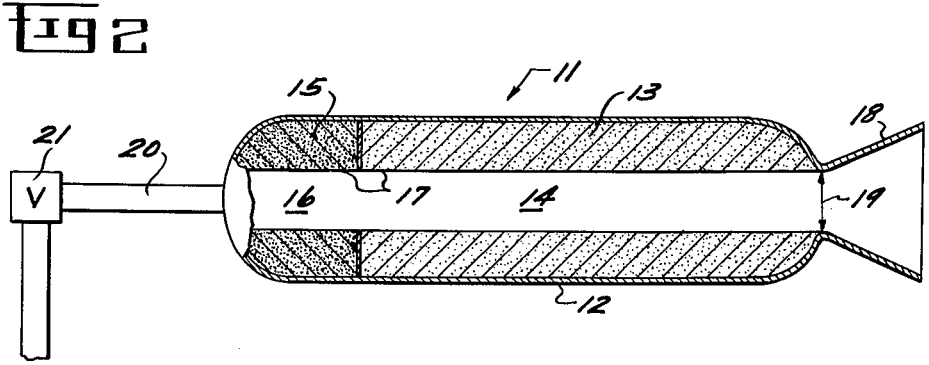
FIGURE 2 is a diagrammatic cross-sectional view of a solid propellant rocket motor having the booster charge in the same casing.
Figure 3:
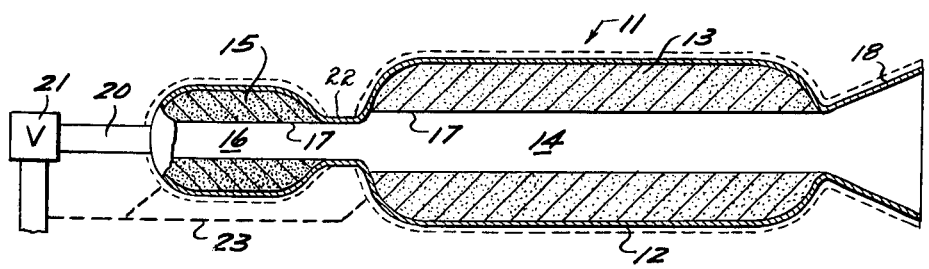
FIGURE 3 is a modification showing diagrammatically a solid propellant rocket motor having a booster charge separate from the main casing.

In FIGURE 2, there is illustrated a typical diagrammatic showing of a solid propellant rocket motor of the instant invention as generally indicated at 11. This motor may consist of a single casing 12 housing a main solid propellant charge 13 designed to burn in downstream main combustion chamber section 14, and a booster charge 15 designed to burn in the booster combustion chamber section 16 in series with the main chamber section. It will be appreciated that this showing is merely diagrammatic and separation may, if desired, be obtained between the main and booster charges and combustion chambers as shown in FIGURE 3 to be described.

The booster charge 15 is preferably composed of a solid fuel requiring an oxidizer to burn. Such oxidizer is supplied as a control fluid as will be explained hereinafter. It will be apparent that the reverse might be used in which case booster charge 15 might be an oxygen-rich solid and the control fluid may be a liquid fuel. In either case the control fluid flow is required to ignite and sustain combustion in the booster by reaction with the booster charge. Combustion takes place along burning surface 17 of both charges. To provide for simplicity, a nozzle 18 with a fixed throat area 19 is connected to the downstream chamber section 14 to form a thrust chamber therewith at the end of the series. It can be seen that the chamber sections are connected in series so that combustion products generated in chamber section 16 flow into main chamber section 14 and thence out through nozzle 18 to provide propulsion. As previously stated, by designing the solid propellant main charge 13 with its burning surface 17 in such manner, that its combustion products are at a pressure below threshold, then the internal pressure in chamber 14 is insufficient to support combustion, and it can be seen that no combustion will take place in motor 11 under normal circumstances without the addition of the control fluid as will be explained hereinafter.

In order to sustain combustion, it is necessary to increase the mass flow of fluid in chamber section 14 to increase the pressure above threshold pressure. This may be done by introducing a fluid mass from an external source as completely described and claimed in the aforementioned basic co-pending application. However, by a direct introduction of external fluid mass as shown in the basic co-pending application, the flow rate, i.e., the external flow required, may be quite high and in the order of approximately ten percent of the main discharge rate from motor 11. Such a large control flow rate requires larger than desired pumps, pipes, valves, etc., and it is desired to reduce the control flow required to achieve the same results. This is accomplished in the instant invention by providing the additional booster charge 15 in which, as seen in FIGURE 2, ignition is initiated and sustained through reaction with the booster charge by the introduction of an external combustion control fluid mass through pipe 20 under the control of valve 21. As previously stated, booster charge 15 may be made up as an oxidizer or a fuel or combination of a suitable nature to combine in a reaction with the externally admitted control fluid and initiate and sustain combustion. The external combustion control fluid may be any suitable liquid mono-propellant such as hydrogen peroxide or a reactive fluid such as fluorine, chlorine tri-fluoride, nitric acid, sulphuric acid, nitrogen tetraoxide, or liquid sodium or phosphorous all depending on the charge in the booster chamber section and which reactive fluid is used for ignition and then its presence is required to sustain combustion by reaction with the charge. In other words, combustion continues only during the admission of the control fluid. "Combustion" and "ignite" as applied to the booster chamber section and used herein is not intended to be restricted only to burning processes although such processes are the preferred form most likely to be used. Similarly, "reaction" is intended to cover the concept of bringing the booster charge and external fluid into contact to generate gases. However, it will be appreciated that, as disclosed herein, the booster chamber section is really a gas generator and the terms "combustion" and "ignite" is intended as an all-inclusive term to cover such forms as may use the reactive fluids noted above. In the event that a mono-propellant is used, a suitable catalyst such as the screen shown in the basic co-pending application would be used to decompose the mono-propellant. It will be apparent, that charge 15 will not burn in the absence of the external fluid mass introduced through pipe 20.

Thus, by the introduction of the external combustion control fluid mass through pipe 20 to initiate combustion of charge 15 by reaction therewith, it can be seen that the products of combustion in chamber 16 and the fluid mass introduced from pipe 20, both flow in the downstream direction into chamber 14. By proper design, this additional pressure in chamber section 14 is insufficient to increase the chamber pressure above threshold pressure either by itself or in conjunction with gas generated by the main charge and permit combustion in chamber 14. Also, selective control or regulation may be obtained by suitable means such as valve 21 to regulate the admission of combustion control fluid. It will be apparent therefore that a small amount of control fluid introduced through pipe 20 may thereby control ignition and combustion in chamber 16 and the products of both, in turn, control combustion in chamber 14. By this sequential or series arrangement, where cumulative effects are used, it is possible to use a small amount of combustion control fluid and smaller hardware to achieve the desired results.

A modification is illustrated in FIGURE 3 wherein like numerals refer to like parts. In this figure, the combustion chamber sections 14 and 16 are shown in a more separated fashion as separated chamber sections connected in series by neck 22 so that the products of combustion may flow downstream in the manner previously described.

In this modification, solid propellant 15 is designed to be ignited by the control fluid as described above and 13 is designed with its burning surface producing combustion products below threshold. Thus, the products of combustion from 15 are required to enable 13 to burn.

In order to sustain combustion, it is necessary to initiate burning in chamber 16 by the introduction of the combustion control fluid whose presence for reaction with charge 15 is also required for combustion to continue. Thus, a sequential and cumulative effect is obtained by introducing the combustion control fluid through pipe 20 under the regulation of valve 21 to initiate and sustain combustion in chamber 16. These products, in turn, are passed through neck or connection 22 downstream into chamber 14 to increase the pressure therein to a point above threshold pressure to support combustion in chamber 14.

Again, it can be seen that a small amount of control fluid and hardware 20, 21 may be used to control a large amount of burning in the propulsion or thrust chamber. The regulation of the control fluid thus enables the combustion in the solid propellants to be turned on and off at will. If desired, regenerative cooling by the control fluid may be obtained by directing it first to the casing as shown very diagrammatically at 23 on the booster casing.

As previously stated, the combustion control fluid may be a suitable liquid mono-propellant such as liquid hydrogen peroxide in which case the liquid or the products of decomposition may be introduced and directed into the combustion chambers in the manner described. It can be seen that the instant invention is an improvement on the basic co-pending application to permit accurate control of solid propellant motors with a smaller amount of control fluid thereby requiring lighter and smaller hardware.

While there has been hereinbefore described the preferred form of my invention, obviously many modifications and variations of the present invention are possible in the light of the above teachings. It is therefore to be understood that within the scope of the appended claims, the invention may be practiced otherwise than as specifically described.

I claim:

1. A controllable solid rocket motor comprising, at least two combustion chamber sections connected in series, a propulsion nozzle connected to the last chamber section to form a thrust chamber at the downstream end of said series, said first upstream combustion chamber section having a charge designed to ignite and produce combustion products therein only upon and during the admission of an external combustion control fluid by reaction with said charge, the immediately adjacent downstream combustion chamber section having a solid propellant charge therein designed to produce combustion products at a pressure below threshold pressure, and means connected to the first upstream chamber section to direct an external combustion control fluid into said chamber section to ignite said chamber charge and continuously support combustion in said chamber section by reaction with said charge, whereby the combustion products pass downstream to increase the pressure in the downstream chamber above threshold pressure to support combustion in said downstream chamber.

2. Apparatus as described in claim 1 wherein valve means is provided in the fluid directing means to regulate the admission of the external combustion control fluid.

3. Apparatus as described in claim 1 wherein the external combustion control fluid is a reactive fluid.

4. Apparatus as described in claim 1 wherein the external combustion control fluid is a liquid mono-propellant.

5. A controllable solid propellant rocket motor comprising, a main combustion chamber section having a solid propellant therein designed to produce combustion products at a pressure below threshold pressure, a propulsion nozzle connected to said main chamber section to form a thrust chamber therewith, a booster combustion chamber section upstream of said main chamber section and connected to discharge into said main chamber section, said booster chamber section having a solid propellant charge therein designed to ignite and produce combustion products only upon and during the admission of an external combustion control fluid by reaction with said charge, and means connected to said booster chamber section to direct an external combustion control fluid into said booster chamber section to ignite said booster chamber charge and continuously support combustion therein by reaction with said charge, whereby the combustion products pass downstream to increase the pressure in the main chamber above threshold pressure to support combustion in said downstream chamber section.

6. Apparatus as described in claim 5 wherein valve means is provided in the fluid directing means to regulate the admission of the external combustion control fluid.

7. Apparatus as described in claim 5 wherein the external combustion control fluid is a reactive fluid.

8. Apparatus as described in claim 5 wherein the external combustion control fluid is a liquid mono-propellant.

9. The method of operating a solid propellant rocket motor consisting of providing a main solid charge having a burning surface designed to produce products of combustion at a pressure less than the threshold pressure, providing another upstream charge of propellant designed to produce combustion products only upon and during the admission of an external combustion control fluid for reaction with the upstream charge, introducing such a fluid to ignite the upstream charge and continuously sustain its combustion, permitting the combustion by reaction with the charge products of the upstream charge to flow downstream to increase the pressure above threshold in the main charge to permit combustion of the main charge, and controlling the combustion by controlling the admission of the external combustion control fluid at will.

References Cited in the file of this patent

UNITED STATES PATENTS

| | | |
|---|---|---|
| 2,555,333 | Grand et al. | June 5, 1951 |
| 2,791,883 | Moore et al. | May 13, 1957 |